United States Patent
Oyamada

(10) Patent No.: US 10,726,013 B2
(45) Date of Patent: Jul. 28, 2020

(54) INFORMATION PROCESSING DEVICE, INFORMATION PROCESSING METHOD, AND RECORDING MEDIUM

(71) Applicant: NEC CORPORATION, Tokyo (JP)

(72) Inventor: Masafumi Oyamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 211 days.

(21) Appl. No.: 15/571,870

(22) PCT Filed: Apr. 26, 2016

(86) PCT No.: PCT/JP2016/002183
§ 371 (c)(1),
(2) Date: Nov. 6, 2017

(87) PCT Pub. No.: WO2016/178312
PCT Pub. Date: Nov. 10, 2016

(65) Prior Publication Data
US 2018/0121509 A1    May 3, 2018

(30) Foreign Application Priority Data
May 7, 2015    (JP) ................................ 2015-094624

(51) Int. Cl.
*G06F 17/30* (2006.01)
*G06F 16/2453* (2019.01)
(Continued)

(52) U.S. Cl.
CPC ........ *G06F 16/24545* (2019.01); *G06F 16/00* (2019.01); *G06F 17/18* (2013.01)

(58) Field of Classification Search
CPC ............... G06F 16/24545; G06F 16/21; G06F 16/24549; G06F 16/245554; G06F 16/1748; G06F 16/2477; G06F 16/24532
See application file for complete search history.

(56) References Cited

U.S. PATENT DOCUMENTS 7,007,009 B2 *  2/2006  Bestgen ............ G06F 16/24545
7,213,012 B2 *  5/2007  Jakobsson ........... G06F 16/2462
(Continued)

OTHER PUBLICATIONS

Oyamada, et al., "Realization of high-speed and precise data collection processing by partial aggregation of data", Information Processing Society of Japan, Database system SIG Technical Report, 2015, pp. 1-7, vol. 2014-DBS-160, No. 19, (http://ci.nii.ac.jp/naid/110009842514).

(Continued)

*Primary Examiner* — Daniel A Kuddus
(74) *Attorney, Agent, or Firm* — Sughrue Mion, PLLC

(57) ABSTRACT

An information processing device includes a statistical value holding unit configured to hold a statistical value of data included in each of two or more blocks into which a data set is divided; a query history holding unit configured to hold information about a past query on the data set as a query history; an estimation unit configured to, based on the query history, estimate a block size that minimizes an average cost of deriving an answer to a query by using the statistical value of at least one of the blocks; and a block creation unit configured to, based on the block size estimated by the estimation unit, create two or more blocks by dividing the data set, calculate the statistical value for each of the created blocks and cause the statistical value holding unit to hold the calculated statistical values.

8 Claims, 14 Drawing Sheets

(51) Int. Cl.
*G06F 17/18* (2006.01)
*G06F 16/00* (2019.01)

(56) References Cited

U.S. PATENT DOCUMENTS

| | | | | |
|---|---|---|---|---|
| 7,552,110 B2* | 6/2009 | Hrle | ............... | G06F 16/3346 |
| 7,805,410 B2* | 9/2010 | Sasaki | ............... | G06F 16/21 |
| | | | | 707/674 |
| 8,321,579 B2* | 11/2012 | Aggarwal | ............... | G06F 17/18 |
| | | | | 709/201 |
| 8,812,481 B2* | 8/2014 | Zuzarte | ............... | G06F 16/24524 |
| | | | | 707/713 |
| 2003/0018618 A1* | 1/2003 | Bestgen | ............... | G06F 16/24545 |
| 2008/0222090 A1* | 9/2008 | Sasaki | ............... | G06F 16/21 |
| 2009/0018992 A1* | 1/2009 | Zuzarte | ............... | G06F 16/24524 |
| 2013/0212074 A1* | 8/2013 | Romanski | ............... | G06F 12/0253 |
| | | | | 707/692 |
| 2014/0214799 A1* | 7/2014 | Li | ............... | G06F 16/24532 |
| | | | | 707/718 |
| 2014/0229464 A1* | 8/2014 | Milenova | ............... | G06F 16/2453 |
| | | | | 707/718 |
| 2016/0275150 A1* | 9/2016 | Bournonnais | ..... | G06F 16/24575 |
| 2017/0024452 A1* | 1/2017 | Budalakoti | ....... | G06F 16/24556 |

OTHER PUBLICATIONS

Masashi Oyamada, et al., "PA-Proxy: Framework increasing the speed of data aggregation process in SQL-on Hadoop without degradation in accuracy", The 7th Forum on Data Engineering and Information Management (13th Annual Meeting of the Database Society of Japan), Mar. 4, 2015, pp. 1-8, (http://db-event.jpn.org/deim2015/paper/285.pdf).

International Search Report for PCT/JP2016/002183 dated Jul. 12, 2016 [PCT/ISA/210].

Written Opinion for PCT/JP2016/002183 dated Jul. 12, 2016 [PCT/ISA/237].

* cited by examiner

Fig. 3

| Age | Height | Weight | Gender |
|---|---|---|---|
| 20 | 178.0 | 62.5 | MALE |
| 51 | 172.5 | 58.0 | MALE |
| 24 | 152.5 | 42.5 | FEMALE |
| 48 | 164.2 | 60.5 | MALE |

Fig. 4

| | Age (int) | Height (float) | Weight (int) | |
|---|---|---|---|---|
| | 401 | 402 | 403 | |
| STATISTICAL VALUE | Min:6 Max:51 | Min:152.0 Max:190.0 | Min:1 Max:4 | |
| DATA | 8 | 178.0 | 1 | BLOCK A |
| | 51 | 190.0 | 2 | |
| | 6 | 152.5 | 3 | |
| | 18 | 164.2 | 4 | |
| STATISTICAL VALUE | Min:2 Max:4 | Min:60.0 Max:155.5 | Min:5 Max:8 | |
| DATA | 3 | 140.0 | 5 | BLOCK B |
| | 4 | 155.5 | 6 | |
| | 3 | 100.5 | 7 | |
| | 2 | 60.0 | 8 | |
| STATISTICAL VALUE | Min:5 Max:10 | Min:100.0 Max:140.2 | Min:9 Max:12 | |
| DATA | 5 | 100.0 | 9 | BLOCK C |
| | 7 | 125.5 | 10 | |
| | 9 | 134.5 | 11 | |
| | 10 | 140.2 | 12 | |

Fig. 5

| QUERY ID 501 | DATE/TIME 502 | QUERY CONDITIONS 503 | | NUMBER OF QUERIED BLOCKS 504 | | P (AVERAGE VALUE OF THE NUMBER OF BLOCKS WHOSE DATA WAS USED INSTEAD OF USING STATISTICAL VALUES) 505 |
|---|---|---|---|---|---|---|
| | | SUBJECT 531 | RANGE 532 | NUMBER OF BLOCKS WHOSE STATISTICAL VALUES WERE USED 541 | NUMBER OF BLOCKS WHOSE DATA WAS USED 542 | |
| ... | ... | ... | ... | ... | ... | |

Fig. 6A

| 600 | 601 DATA SET PARAMETERS | | | 602 NUMBER OF BLOCKS WHOSE DATA WAS USED INSTEAD OF USING STATISTICAL VALUES (P) | 603 BLOCK READING COST (READBLOCKCOST) | 604 STATISTICAL VALUE READING COST (READMETACOST) | 605 COST (COST(B)) | 606 NUMBER OF BLOCKS GIVING MINIMUM COST (B) | 607 BLOCK SIZE GIVING MINIMUM COST (N/B) |
|---|---|---|---|---|---|---|---|---|---|
| | NUMBER OF TUPLES N | NUMBER OF BYTES STUPLE | NUMBER OF BYTES FOR STATISTICAL VALUES SAGG | STORAGE PAGE SIZE SPAGE | | | | | | |
| | | | | | | | | | | |

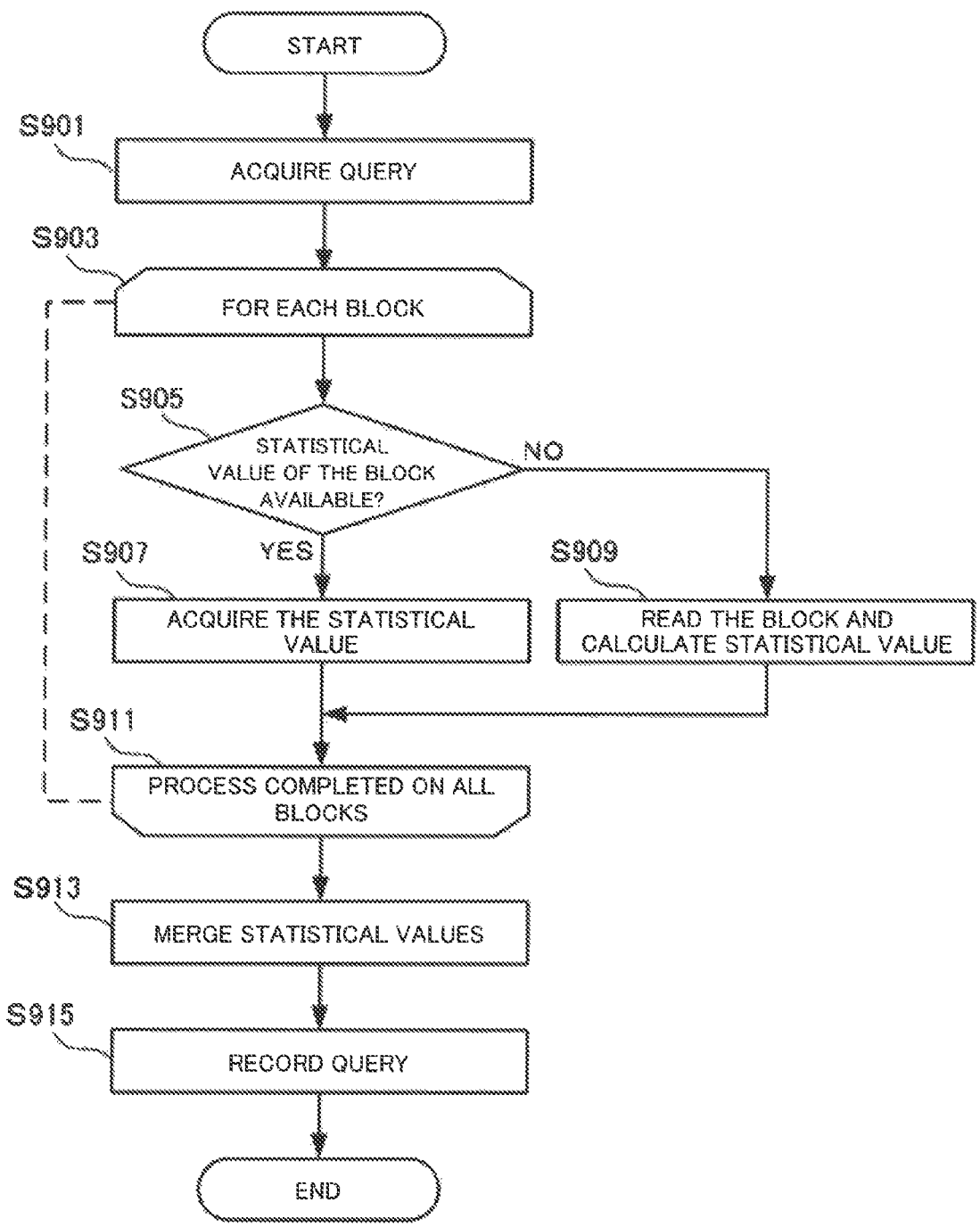

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2016/002183, filed on Apr. 26, 2016, which claims priority from Japanese Patent Application No. 2015-094624, filed on May 7, 2015, the contents of all of which are incorporated herein by reference in their entirety.

TECHNICAL FIELD

The disclosed subject matter relates to an information processing device, an information processing method and a recording medium.

BACKGROUND ART

In the above-described technical field, Non Patent Literature 1 (NPL 1) discloses dividing a data set into two or more blocks and calculating statistical values for each of the blocks when performing statistical processing using the data set. NPL 1 further discloses a technology which, by reuse of a statistical value for each of the blocks calculated in advance, eliminates record scanning, accordingly reduces the Input/Output (I/O) amount and the calculation amount and consequently increases the speed of statistical processing of an attribute.

CITATION LIST

Non Patent Literature

[NPL 1] Oyamada et al., "Realization of high-speed and precise data collection processing by partial aggregation of data", Information Processing Society of Japan, Database system SIG Technical Report 2014-DBS-160 (19), pp. 1-7, 2015 (http://ci.nii.ac.jp/naid/110009842514).

SUMMARY OF INVENTION

Technical Problem

However, in the technology described in the above document, performance of the statistical processing by reuse of statistical values is largely influenced by the block size, and it accordingly is possible that the speed of statistical processing cannot be increased when an inappropriate block size is selected.

An objective of the disclosed subject matter is to provide a technology that resolves the foregoing issue.

Solution to Problem

To achieve the objective, one aspect of an information processing device according to the disclosed subject matter, the information processing device includes a statistical value holding unit configured to hold a statistical value of data included in each of two or more blocks into which a data set is divided. The information processing device includes a query history unit configured to hold information about a past query on the data set as a query history and an estimation unit configured to, based on the query history, estimate a block size that minimizes an average cost of deriving an answer to a query by using the statistical value of at least one of the blocks. The information processing device includes a block creation unit configured to, based on the block size estimated by the estimation unit, create two or more blocks by dividing the data set, calculate the statistical value for each of the created blocks and cause the statistical value holding unit to hold the calculated statistical values. p To achieve the objective, one aspect of an information processing method according to the disclosed subject matter, the information processing method includes holding information about a past query on a data set as a query history and based on the query history, estimating a block size that minimizes an average cost of deriving an answer to a query by using statistical value of at least one of blocks. The information processing method includes based on the block size estimated, creating two or more blocks by dividing the data set, and also calculating statistical values for each of the created blocks.

To achieve the objective, a non-transitory computer readable recording medium stores an information processing program according to the disclosed subject matter. The information processing program causes a computer to execute the following processes: holding information about a past query on a data set as a query history; based on the query history, estimating a block size the minimizes an average cost of deriving an answer to a query by using statistical value of at least one of the blocks; and based on the block size estimated in the estimation step, creating two or more blocks by dividing the data set, calculating the statistical value for each of the created blocks.

Advantageous Effects of Invention

According to the disclosed subject matter, the speed of statistical processing can be increased.

BRIEF DESCRIPTION OF DRAWINGS

FIG. 3 is a diagram illustrating an example of input data according to the second example embodiment.

FIG. 4 is a diagram illustrating an example of contents of statistical values and data held by a statistical value holding unit and a data holding unit according to the second example embodiment.

FIG. 5 is a diagram illustrating an example of a configuration of a data table held by a query history holding unit according to the second example embodiment.

FIG. 9 is a flow chart illustrating a flow of a process performed when executing a query in the information processing device according to the second example embodiment.

DESCRIPTION OF EMBODIMENTS

Hereinafter, example embodiments will be illustratively described in detail, with reference to drawings. Here, constituent elements in the following example embodiments are described only as examples, but they are not intended to limit the technical scope of the disclosed subject matter to only them.

First Example Embodiment

Figure 1:
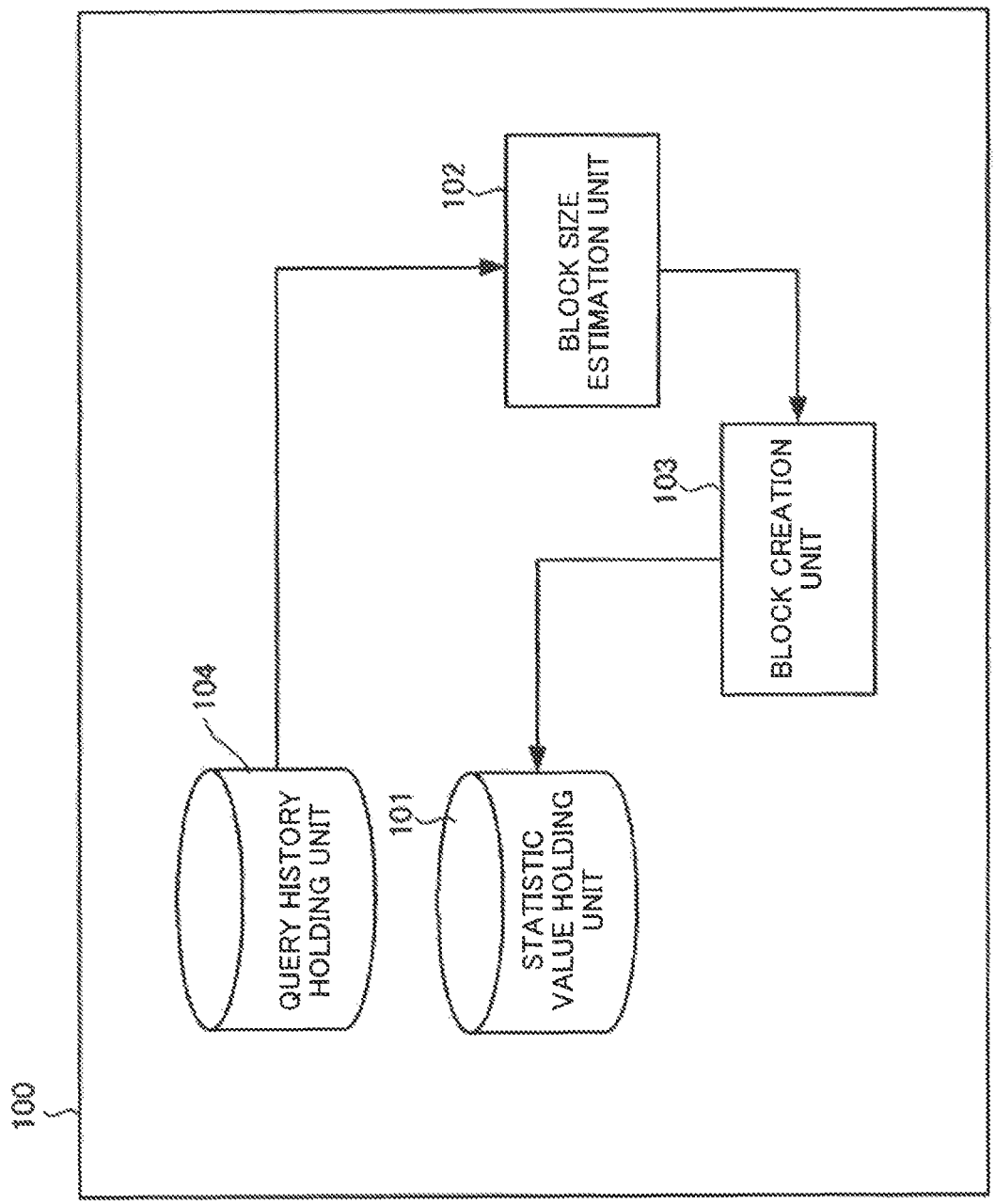
FIG. 1 is a block diagram illustrating a configuration of an information processing device according to a first example embodiment.

An information processing device, as a first example embodiment, will be described using FIG. 1. An information processing device 100 is a device including a statistical value holding unit 101, a block size estimation unit 102, a block creation unit 103 and a query history holding unit 104.

The statistical value holding unit 101 holds statistical values of data included in each of two or more blocks into which a data set is divided.

The block size estimation unit 102 estimates a block size in a manner to minimize an average cost of deriving an answer to a query by the use of statistical values of some of the blocks, on the basis of a query history held by the query history holding unit 104. Here, when the data set is configured as a table including two or more records, the block size is, for example, a size expressing the number of records to be an interval at which advance calculation of the statistical values is performed.

Based on the block size estimated by the block size estimation unit 102, the block creation unit 103 divides the data set to create two or more blocks, calculates statistical values for each of the created blocks and causes the statistical value holding unit 101 to hold the statistical values.

The query history holding unit 104 holds information about past queries with respect to the data set, as a query history.

According to the present example embodiment, a data set is divided by a block size which is estimated in a manner to minimize an average cost of deriving an answer to a query, and statistical values calculated for the respective blocks are used in statistical processing and, as a result, execution time of the statistical processing can be reduced.

Second Example Embodiment

Next, an information processing device according to a second example embodiment will be described using FIGS. 2 to 9. Here, in the drawings, similar reference signs will be assigned to similar constituent elements, and their descriptions will be properly omitted.

Technical Premise

A relational database system (Relational Database Management System) holds tabular form data based on a relational model (hereafter, referred to as a table), and provides a user with effective search and update of the data. Each row in the table is referred to as a record, which represents one data element. Each piece of data can have one or more attributes, where columns in the table correspond to the respective attributes. A list of <column name, data type> for columns included in the table is referred to as a schema of the table.

A user of the relational database system requests the relational database system to perform search processing and update processing on the table, to the relational database system by use of a programming language. Such an instruction is referred to as a Query. To describe the query, a programming language called Structured Query Language (SQL) is normally used. Using SQL, a record meeting a condition can be extracted from the table easily and effectively. Further, by specifying a column name, only a necessary one of the attributes can be extracted from a record.

One of processing operations frequently performed in a relational database system is statistical processing of attribute. The statistical processing of attribute is processing for calculating some kind of statistical value from a group of values for a predetermined attribute in a table, where examples of the statistical value include a maximum value, a minimum value, an average value, standard deviation and the like.

In many cases, the statistical processing of attribute is performed on all or most of records in a table. Accordingly, in a case of a very large table, it becomes necessary to scan a large number of records, which causes a large amount of I/O processing and calculation processing and, as a result, the processing time becomes very long.

Description of Present Example Embodiment

Figure 2:
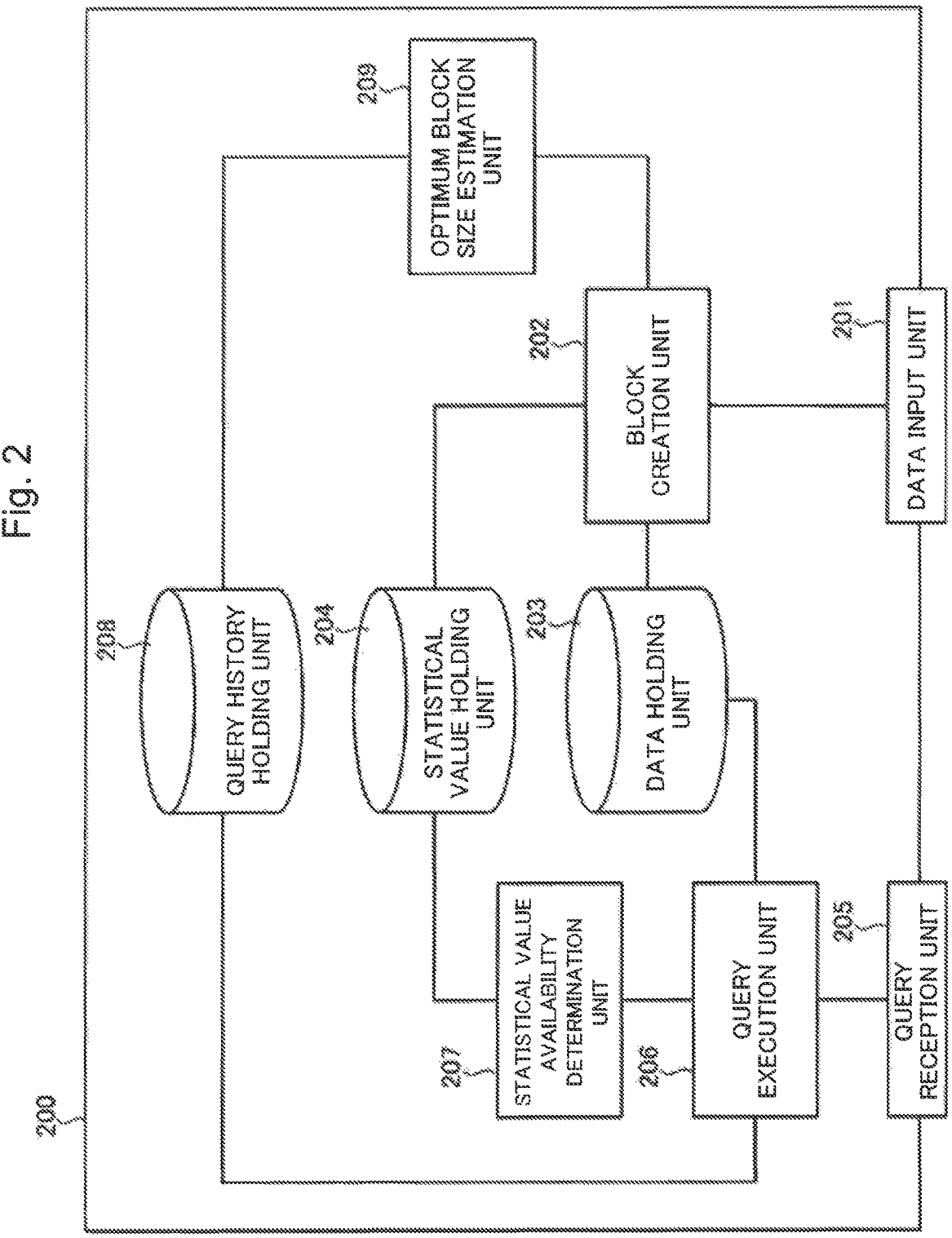
FIG. 2 is a block diagram illustrating a functional configuration of an information processing device according to a second example embodiment.
Figure 6:
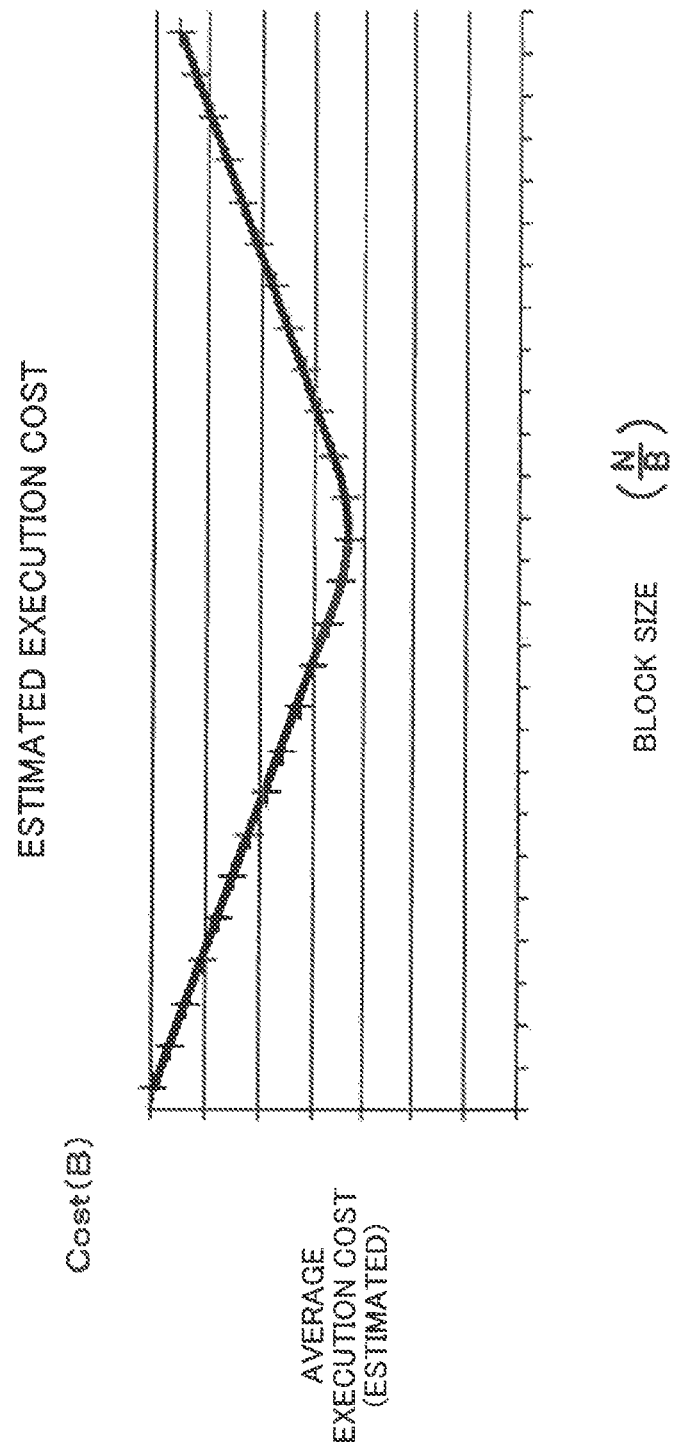
FIG. 6A is a diagram illustrating a configuration of a block size estimation table according to the second example embodiment.
FIG. 6B is a diagram illustrating a relationship between block size and average execution cost according to the second example embodiment.

FIG. 2 is a block diagram illustrating a functional configuration of the information processing device according to the present example embodiment. In FIG. 2, the blocks represent the configuration not in terms of hardware units but in terms of functional units.

The information processing device 200 includes a data input unit 201, a block creation unit 202, a data holding unit 203, a statistical value holding unit 204 and a query reception unit 205. The information processing device 200 further includes a query execution unit 206, a statistical value availability determination unit 207, a query history holding unit 208 and an optimum block size estimation unit 209. Each of the units will be described below.

Data Input Unit

The data input unit 201 inputs data to be a processing subject of the information processing device 200. An example of the data form is a table in a relational database system.

There are a variety of ways for the data input unit 201 to input a data set. For example, the data input unit 201 acquires a data set which is input from an external device. For another example, the data input unit 201 acquires a data set which is manually input. Further, the data input unit 201 may input a data set by accessing an external device.

Block Creation Unit

The block creation unit 202 converts the data set having been input by the data input unit 201 into files, in order to store the data set into a storage device such as a primary or secondary storage device. At that time, the block creation unit 202 communicates with the optimum block size estimation unit 209 and thereby acquires a block size which is expected to enable subsequent information processing to be performed fastest. Further, according to the block size, the block creation unit 202 divides the data set input to the data input unit 201, and calculates statistical values of data for each of the divided blocks. Then, the block creation unit 202 stores the data set into the data holding unit 203 and also stores the statistical values of data into the statistical value holding unit 204. The data holding unit 203 and the statistical value holding unit 204 may be provided in the same storage device, or may be provided in respective ones of different storage devices.

For example, in a case of a tabular form data set, the block creation unit 202 receives the number of records as a block size and, after horizontally dividing the table at an interval of the number of records, calculates statistical values, such as a maximum value and a minimum value, of each attribute, and stores the statistical values into the statistical value holding unit 204. In the present and following example embodiments, dividing a table by taking records as a unit of division is referred to as horizontal division.

Here, the block creation unit 202 may create blocks physically, or may create blocks merely logically. An example of a case of physical block creation is that of storing the blocks separately into the data holding unit 203 in the form of different files. An example of logical block creation is that of storing a data set into the data holding unit 203 in the form of a single file. Further, a pointer for each data group constituting a block included in a file in the data holding unit 203 is held, along with statistical value information on each block held in the statistical value holding unit 204.

Data Holding Unit

The data holding unit 203 holds the files created by the block creation unit 202 in a storage device. The storage device may be a primary storage device or a secondary one.

Statistical Value Holding Unit

The statistical value holding unit 204 holds the statistical values for each block calculated by the block creation unit 202, in a storage device. The storage device may be a primary storage device or a secondary one.

Query Reception Unit

The query reception unit 205 acquires an instruction for processing of the data set held by the data holding unit 203. Examples of the order are SQL and Hive Query Language (NPL 1) which are each a kind of programming language for describing a query on a data set.

Examples of the query are processing for collecting statistical values, such as a maximum value, a minimum value, an average value and standard deviation, from a data set, processing operations for selection, combining and projection which are used in a relational database, complicated information processing constituted by a combination of those processing operations, and the like.

Query Execution Unit

The query execution unit 206 executes the query acquired by the query reception unit 205. At that time, the query execution unit 206 communicates with the statistical value availability determination unit 207, and thereby checks whether it is possible or not to reuse a statistical value calculated in advance for each block of the data set subjected to the processing. Accordingly, for a block whose statistical value can be reused, the query execution unit 206 acquires the statistical value calculated in advance, from the statistical value holding unit 204. For a block whose statistical value cannot be reused, the query execution unit 206 acquires the block from the data holding unit 203 and, using necessary ones among pieces of data included in the acquired block, calculates a statistical value. Then, from thus acquired statistical values for the blocks, the query execution unit 206 constructs a final result on the query and outputs it as an answer value to the query.

Statistical Value Availability Determination Unit

The statistical value availability determination unit 207 determines whether it is possible or not to reuse a statistical value calculated in advance for each block of the data set subjected to the processing. A case where a statistical value of a certain block can be reused is that where every piece of data in the block is included in the query subjects. To determine whether or not each block is in such a case without checking the actual content of the block, the statistical value availability determination unit 207 acquires statistical values of each block (for example, the maximum and minimum values of an attribute for specifying the query subjects) from the statistical value holding unit 204. Then, using the acquired statistical values, the statistical value availability determination unit 207 determines, for each block, whether or not every piece of data included in the block is a query subject (for example, whether or not the range between the maximum and minimum values of the attribute for the block is within the range of the query subjects).

For example, it is assumed that information on employees of a company is held by dividing it into three blocks consisting of a "block of ages from 20 to 30 years old (the minimum age value=20, the maximum value=30)", a "block of ages from 31 to 40 years" and a "block of ages from 41 to 65 years". In that state, it is assumed that "an average salary of employees aged 35 years or younger" is given as a query. In that case, as the query subjects are employees aged 35 years or younger, such employees meeting the condition are present in two blocks including the "block of ages from 20 to 30 years" and the "block of ages from 31 to 40 years". Here, for the "block of ages from 20 to 30 years", every employee in the block is a subject of the query and, accordingly, a statistical value calculated for the block in advance can be reused. On the other hand, it is possible that the "block of ages from 31 to 40 years" includes data on employees not to be a subject of the query (for example, employees aged from 36 to 40 years) and, accordingly, no statistical value calculated for the block in advance can be reused.

Query History Holding Unit

The query history holding unit 208 holds information about past queries processed by the information processing device 200, as a history. The history may be a complete record of queries, or may be statistical information representing a query pattern which frequently occurs. As specific examples of the history, there are mentioned the number of referred statistical values, the number of referred pieces of block data and the like for each of query contents (for example, a queried range). Also mentioned is information such as about time spent for the above-mentioned reference operations, about time, the number of I/O operations and a data size spent for calculating statistical values, and about an expected value regarding the number of attributes and the like used for specifying a queried range. The history is used by the optimum block size estimation unit 209 when estimating an average cost of deriving an answer to a query.

Optimum Block Size Estimation Unit

The optimum block size estimation unit 209 estimates a block size which is expected to minimize an average cost of processing for answering to a query performed by the query execution unit 206. The optimum block size estimation unit 209 has a cost function for estimating the average cost of deriving an answer to a query taking a block size as input. As the cost function can use information such as about a data size and an expected value regarding the number of attributes and the like used for specifying a query, the optimum block size estimation unit 209 acquires such information by communicating with the block creation unit 202 and the query history holding unit 208. In the optimum block size estimation, a block size for minimizing the cost function is calculated and is determined to be an optimum block size.

In the optimum block size estimation, the optimum block size estimation unit 209 creates a block size estimation table 600 to estimate an optimum block size.

Next, a specific cost function in the optimum block size estimation unit 209 will be described.

In the present example embodiment, statistical value reading from the statistical value holding unit 204 occurs when a statistical value of a block can be reused, and operation of reading data of a block from the data holding unit 203 occurs when no statistical value of the block can be reused. Accordingly, denoting the number of blocks (expressing at an interval of how many records, statistical values are calculated) by B, the cost function is expressed as Cost($B$)=ReadBlockCost+ReadMetaCost [Equation. 1]

There, the cost function is expressed as a sum of an I/O cost of reading blocks (ReadBlockCost) and an I/O cost of reading statistical values (ReadMetaCost).

Considering as the I/O costs the numbers of page referring operations to occur in those kinds of processing (the numbers of I/O operations at the storage level), the cost of reading blocks (the number of page referring operations) is represented by a following equation when it is expressed using a ceiling function for calculating a round up value.

$$ReadBlockCost = \left\lceil \frac{P\left\lceil \frac{N}{B} \right\rceil Stuple}{Spage} \right\rceil$$ [Equation. 2]

This represents the number of page referring operations which occur in reading, Read (reading of an entire block), of P number of blocks. Practically, P is assumed to be the number of blocks referred to by Read on average (which is acquired from the query history holding unit). Here, N represents the number of data elements (the total number of tuples), Spage the page size (in the number of bytes) in the storage, Stuple the size of each data element (in the number of bytes).

Here, $$\left\lceil \frac{N}{B} \right\rceil$$ [Equation. 3]

is the number of tuples in each block, and $$\left\lceil \frac{N}{B} \right\rceil Stuple$$ [Equation. 4]

is the size of each block.

Further, the cost of reading statistical values (the number of page referring operations) is represented by a following equation when it is expressed using a ceiling function for calculating a round up value.

$$ReadMetaCost = \left\lceil \frac{(B-P)Sagg}{Spage} \right\rceil$$ [Equation. 5]

This represents the number of page referring operations which occur in reading of (B-P) number of block statistical values. Here, Sagg represents the number of bytes necessary for holding a statistical value of one block.

According to the cost model, with increasing the number of blocks B, the size of each block is reduced and, accordingly, the number of I/O operations to occur in block reading decreases. However, it is noticed that because the number of blocks is increased at the same time, the number of statistical values also is increased and, accordingly, the number of I/O operations to occur in statistical value reading increases. Because of the trade-off relation, the cost function becomes a convex function and has a minimum value. The number of blocks B giving the minimum value is determined to be the optimum number of blocks for minimizing the average cost of the query processing, and a result of dividing the total number of tuples by the optimum number of blocks is determined to be the optimum block size.

FIG. 3 is a diagram illustrating an example of a configuration of data which is input by the data input unit 201. For example, the data input by the data input unit 201 is tabular form data, where each row of the table corresponds to one record (for example, information on an employee) and each column of the table corresponds to an attribute of the records (for example, age, height, weight, gender and the like of the employees).

FIG. 4 is a diagram illustrating an example of a configuration of held contents of data and statistical values which are respectively held by the data holding unit 203 and the statistical value holding unit 204. In the diagram, data is divided into blocks A to C and, for each of the blocks, data 405 and statistical values 404 in terms of each of a plurality of attributes 401 to 403 are held. Here, the data and the statistical values may be separately held.

FIG. 5 is a diagram illustrating an example of a configuration of a data table 500 for historical data, which is held by the query history holding unit 208. The table 500 in FIG. 5 holds, for each query ID 501, query date/time 502, query conditions 503, the number of queried blocks 504 and an average value (P) 505 of the number of blocks whose data was used instead of using the statistical values when the query was made. The query conditions 503 include a query subject 531, a queried range 532 and the like. The number of queried blocks 504 includes the number of blocks 541 whose statistical values were used and the number of blocks 542 whose data was used. Here, the average value (P) 505 of the number of blocks whose data was used instead of using the statistical values when the query was made is updated each time a query is made. On the basis of the query history held by the query history holding unit 208, the optimum block size estimation unit 209 estimates a block size by the use of statistical values of each block. That is, the optimum block size estimation unit 209 estimates a block size for dividing a data set into two or more blocks such that the average cost of processing performed for answering to a query by using statistical values of each block is minimized.

FIG. 6A is a diagram illustrating a configuration of a block size estimation table 600 to be used by the optimum block size estimation unit 209. The block size estimation table 600 includes parameters of a set data (the number of tuples N, a size of each element (in the number of bytes) Stuple, the number of bytes necessary for holding statistical values of each block Sagg and a page size of the storage (in the number of bytes) Spage). The block size estimation table 600 further includes an average value (P) 602 of the number of blocks whose data was used instead of using the statistical values when the query was made and a cost of reading blocks (ReadBlockCost) 603. Furthermore, the block size estimation table 600 includes a statistical value reading cost (ReadMetaCost) 604, a cost (Cost(B)) 605, an estimated number of blocks (B) 606 giving a minimum cost and an estimated block size (N/B) 607 giving the minimum cost.

FIG. 6B is a diagram in which values of the average execution cost (Cost(B)) (estimated) are plotted for various block size values (N/B). As seen from the diagram, the average cost decreases with increasing the block size up to some value but increases again when the block size is further increased after exceeding an optimum block size.

Example of Hardware Configuration

Next, an example of a hardware configuration of the information processing device 200 according to the present example embodiment will be described, with reference to FIG. 7.

Figure 7:
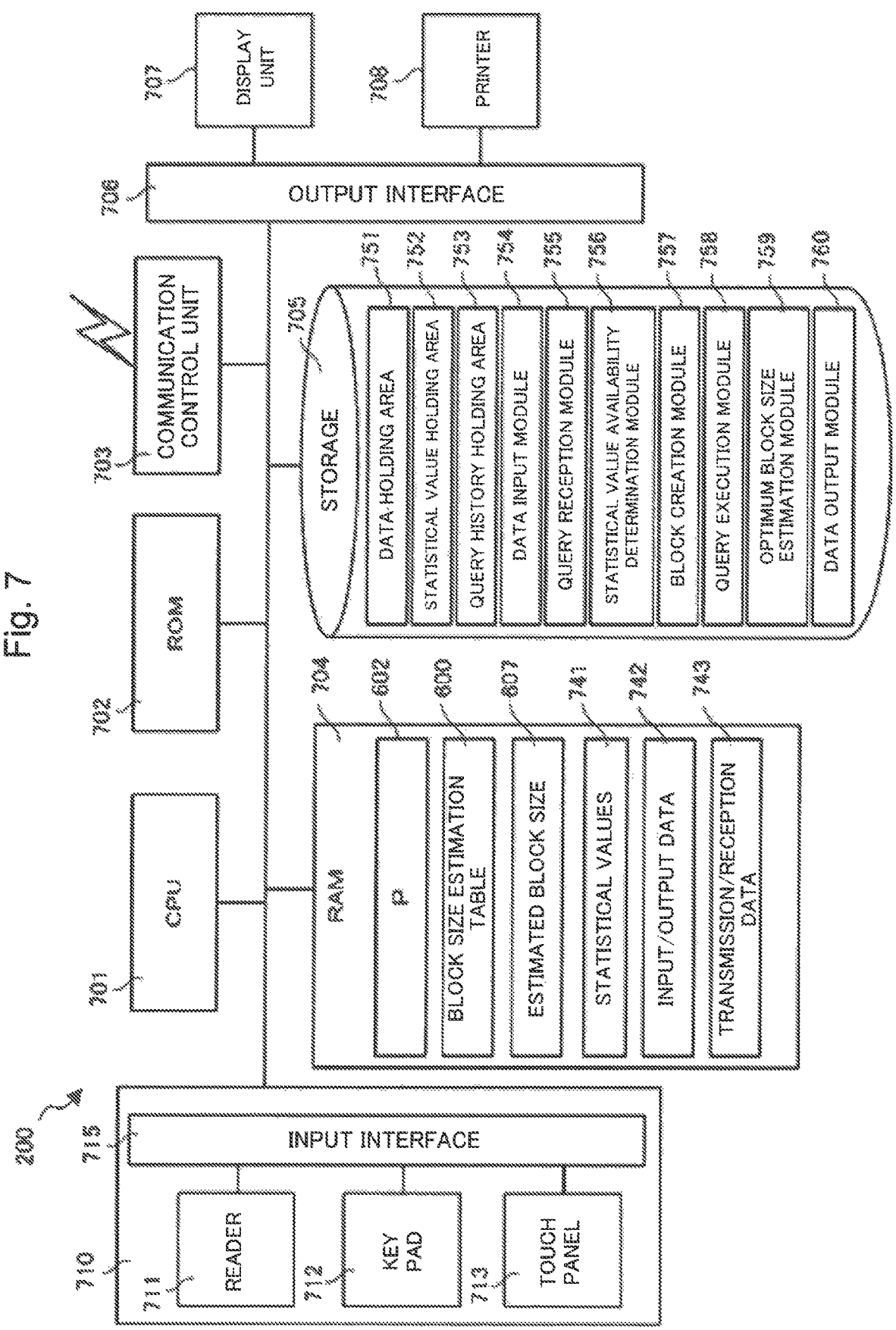
FIG. 7 is a block diagram illustrating a hardware configuration of the information processing device according to the second example embodiment.

As in FIG. 7, the information processing device 200 includes a Central Processing Unit (CPU) 701, a Read Only Memory (ROM) 702, a communication control unit 703 and a Random Access Memory (RAM) 704. The information processing device 200 further includes a storage 705, an output interface 706, a display unit 707, a printer 708 and an input unit 710. The CPU 701 is a central processing unit, which controls the whole of the information processing device 200 by executing various programs.

The ROM 702 is a read only memory, which stores a boot program to be executed first by the CPU 701, and also stores various parameters and the like. The communication control unit 703 controls communication with various devices via a network. The RAM 704 is a random access memory, which holds the average value (P) 602 of the number of blocks whose data was used instead of using the statistical values when the query was made and the block size estimation table 600. The RAM 704 also holds the estimated block size (N/B) 607 giving a minimum cost, the statistical values 741, input/output data 742 and transmission/reception data 743.

The storage 705 includes a data holding area 751, a statistical value holding area 752 and a query history holding area 753. The storage 705 also includes a data input module 754, a query reception module 755, a statistical value availability determination module 756 and a block creation module 757. Further, the storage 705 includes a query execution module 758, an optimum block size estimation module 759, a data output module 760 and the like.

The input unit 710 includes a reader 711, a key pad 712, a touch panel 713 and an input interface 715 which transfers input from those devices to the CPU 701. Here, the reader 711 is assumed to be a bar code reader, for example, but it may also be an Radio Frequency Identifier (RFID) tag reader or the like.

On the other hand, an answer to a query received by the query reception module 755 via the input unit 710 or the communication control unit 703 is sent to an external device via the communication control unit 703, or is output to the display unit 707 and the printer 708 via the output interface 706.

Here, the data input unit 201 is implemented by the CPU 701, the ROM 702, the communication control unit 703, the RAM 704, the input unit 710 and the data input module 754.

The block creation unit 202 is implemented by the CPU 701, the ROM 702, the RAM 704 and the block creation module 757.

The data holding unit 203 is implemented by the data holding area 751 of the storage unit 705.

The statistical value holding unit 204 is implemented by the statistical value holding area 752 of the storage unit 705.

The query reception unit 205 is implemented by the CPU 701, the ROM 702, the communication control unit 703, the RAM 704, the input unit 710 and the query reception module 755.

The query execution unit 206 is implemented by the CPU 701, the ROM 702, the RAM 704 and the query execution module 758.

The statistical value availability determination unit 207 is implemented by the CPU 701, the ROM 702, the RAM 704 and the statistical value availability determination module 756.

The optimum block size estimation unit 209 is implemented by the CPU 701, the ROM 702, the RAM 704 and the optimum block size estimation module 759.

The query history holding unit 208 is implemented by the query history holding area 753 of the storage unit 705.

Process Flow

Figure 8A:
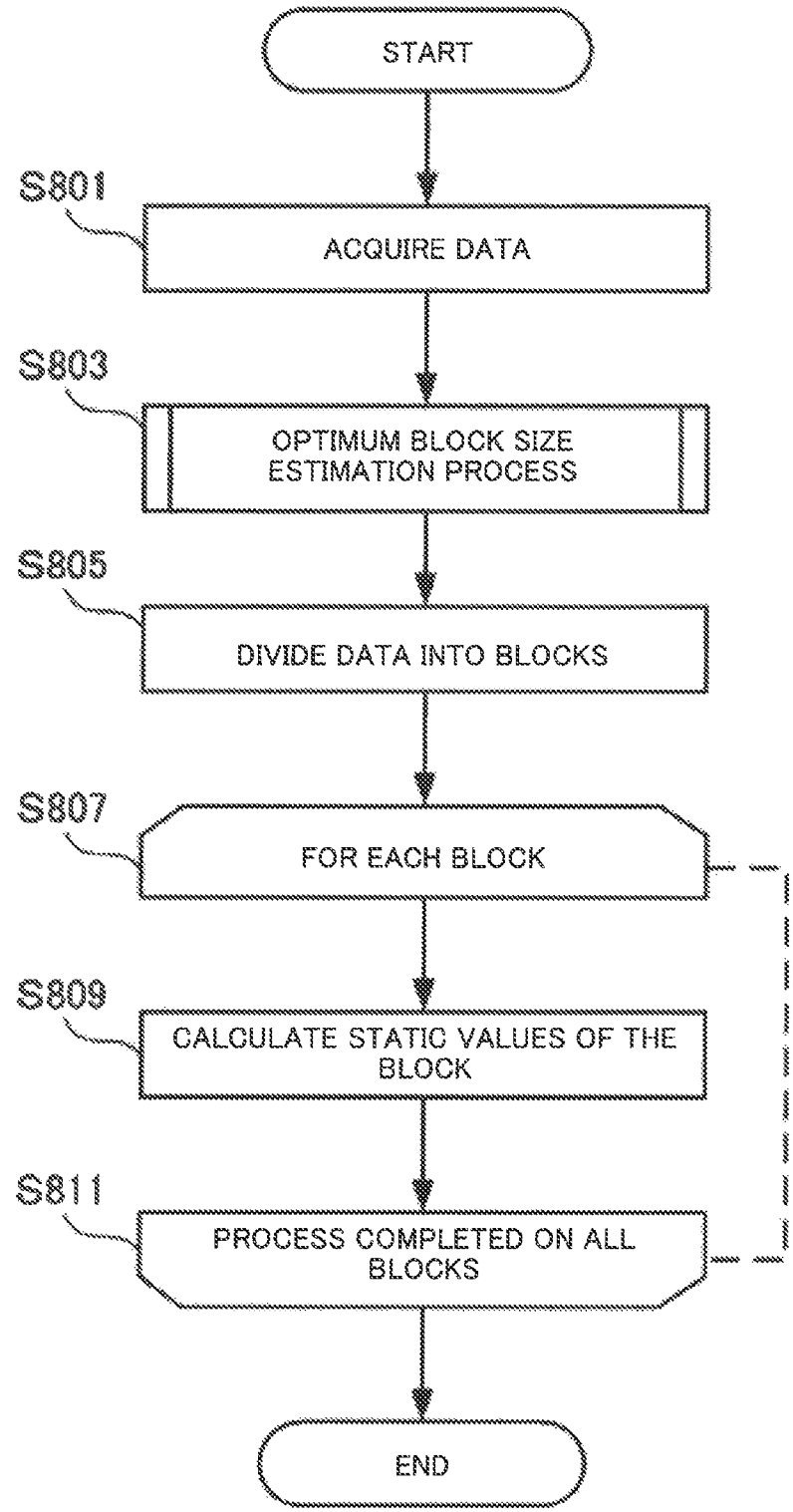
FIG. 8A is a flow chart illustrating a procedure of a data storage process according to the second example embodiment.

FIG. 8A is a flow chart illustrating a flow of a process performed when a data set is input, in the information processing device 200 of the present example embodiment. In a step S801, the data input unit 201 inputs a data set. In a step S803, the optimum block size estimation unit 209 calculates and estimates a block size for minimizing the average cost of a query with respect to the input data set, using information acquired from the block creation unit 202 and from the query history holding unit 208. In a step S805, using the block size calculated by the optimum block size estimation unit 209, the block creation unit 202 divides the data set into blocks and stores the blocks into the data holding unit 203. In steps S807 to S811, the block creation unit 202 calculates statistical values for each of the blocks and, after completing calculation of statistical values for every one of the blocks, stores the statistical values into the statistical value holding unit 204.

Figure 8B:
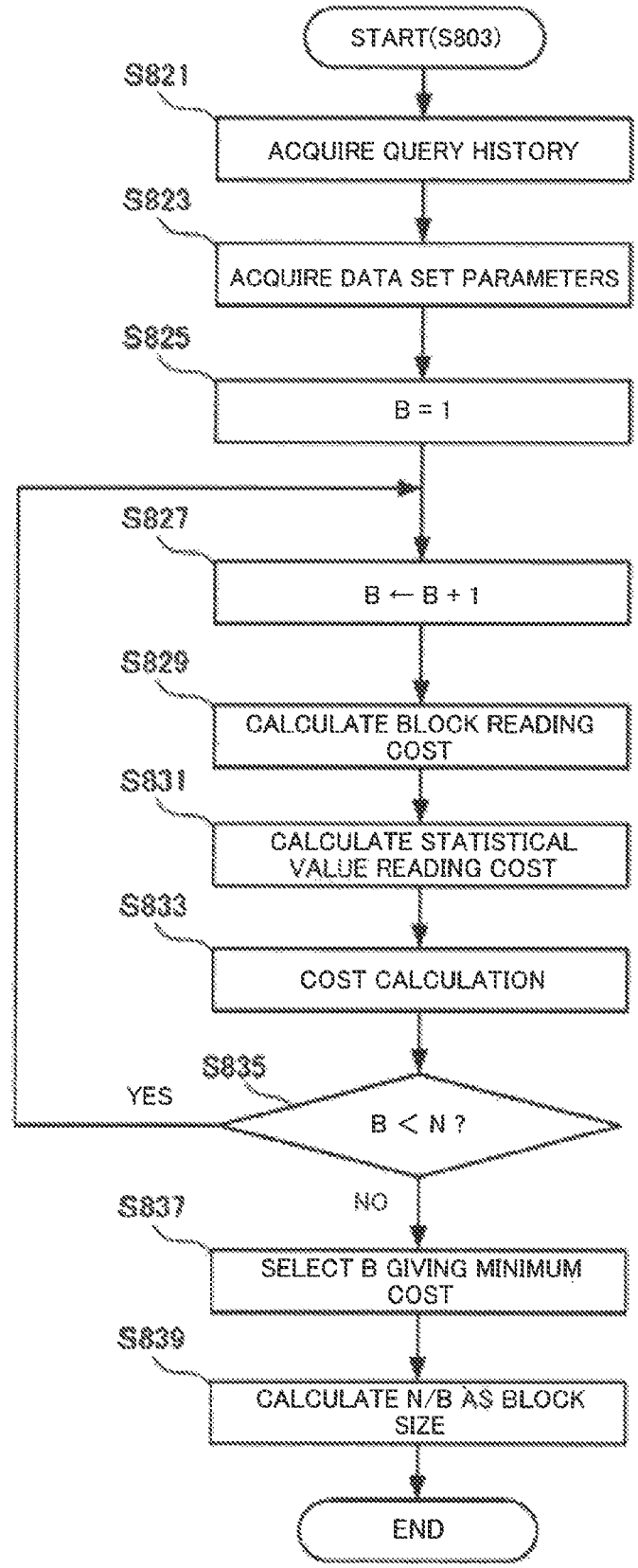
FIG. 8B is a flow chart illustrating a procedure of an optimum block size estimation process according to the second example embodiment.

Next, details of the process in the step S803 will be described with reference to FIG. 8B.

In a step S821, the optimum block size estimation unit 209 acquires a query history from the query history holding unit 208. In a step S823, the optimum block size estimation unit 209 acquires set data parameters 601. Next, in a step S825, the optimum block size estimation unit 209 sets the number of blocks B at 1. Then, in a step S827, the optimum block size estimation unit 209 increments the number of blocks B by 1. Subsequently, in a step S829, the optimum block size estimation unit 209 calculates a block reading cost. Further, in a step S831, the optimum block size estimation unit 209 calculates a statistical value reading cost. Subsequently, in a step S833, the optimum block size estimation unit 209 calculates a cost by summing up the results of the above-mentioned calculations. Next, in a step S835, the optimum block size estimation unit 209 determines whether or not the number of blocks B is smaller than the number of data elements N. If the number of blocks B is smaller than the number of data elements N, the optimum block size estimation unit 209 continues the process by proceeding to the process of the step S827. If the number of blocks B is equal to or larger than the number of data elements N, the optimum block size estimation unit 209 selects the number of blocks B at that time as the number of blocks B for minimizing the average cost, in a step S837. Then, in a step S839, the optimum block size estimation unit 209 calculates N/B as a block size for minimizing the average cost.

FIG. 9 is a flow chart illustrating a flow of a process performed at a time of executing a query in the information processing device 200 of the present example embodiment. In a step S901, the query reception unit 205 acquires a query. In steps S903 to S911, the query execution unit 206 calculates a statistical value for each block. Specifically, in the step S905, the statistical value availability determination unit 207 determines, for each block, whether it is possible or not to reuse in the query a statistical value which was calculated in advance and then stored in the statistical value holding unit 204. If the statistical value can be reused, the query execution unit 206 acquires the statistical value of the block from the statistical value holding unit 204 via the statistical value availability determination unit 207, in the step S907. If the statistical value cannot be reused, the query execution unit 206 reads data of the block from the data holding unit 203 and calculates a statistical value using necessary part of the data, in the step S909. In the step S911, the query execution unit 206 completes acquisition of a statistical value of every one of blocks within a range with respect to which the query is made and acquisition of statistical values with respect to data included in blocks whose statistical values cannot be reused. Next, in a step S913, the query execution unit 206 merges the acquired statistical values and thereby calculates a final query result. Subsequently, in a step S915, the query execution unit 206 records information on the executed query into the query history holding unit 208.

According to the present example embodiment, a block size for minimizing the average cost of deriving an answer to a query is determined, a data set is divided using the block size, and a statistical value of data calculated for each block is reused, and as a result it becomes possible to increase the speed of executing statistical processing.

Third Example Embodiment

Figure 10:
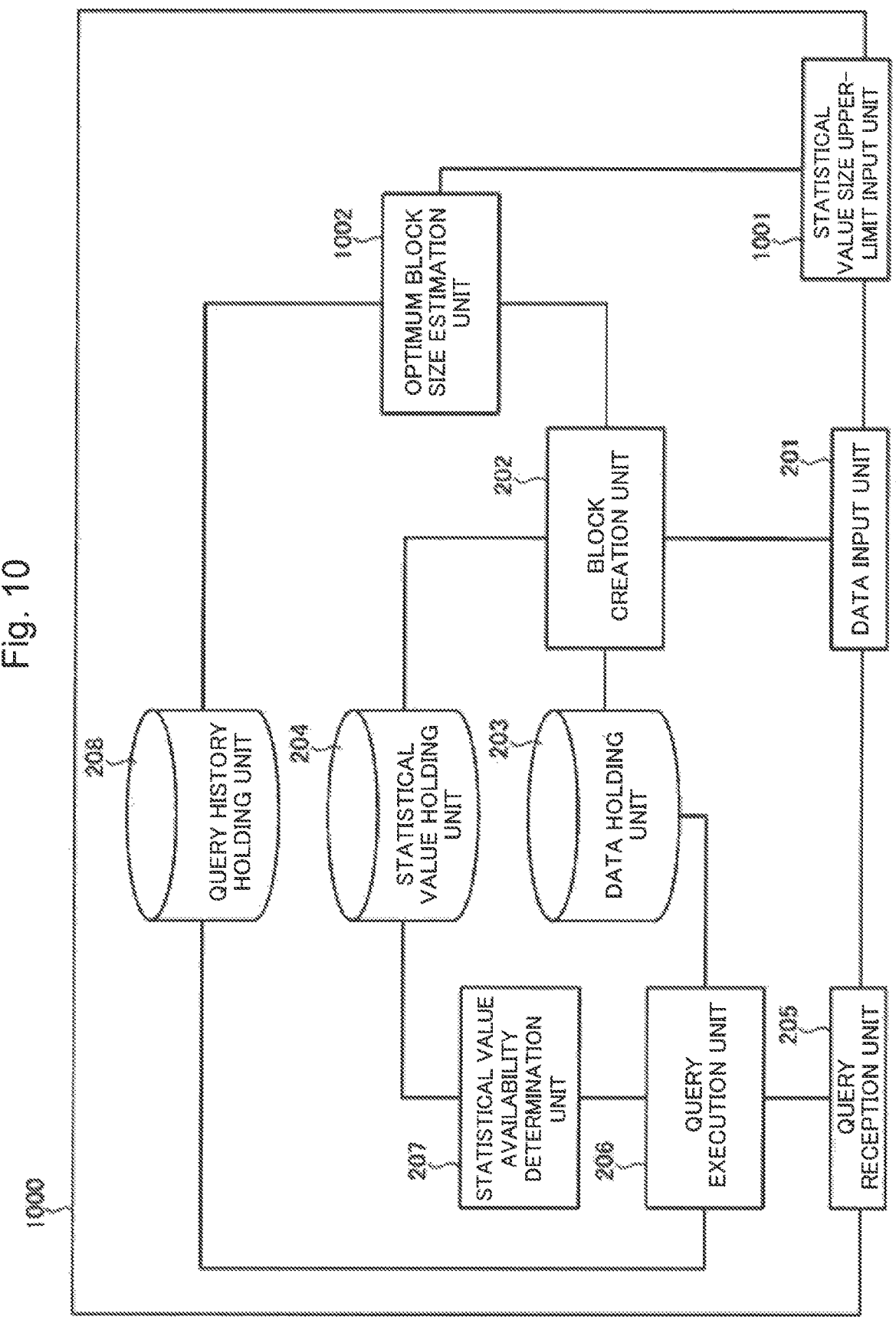
FIG. 10 is a block diagram illustrating a functional configuration of an information processing device according to a third example embodiment.

Next, an information processing device according to a third example embodiment will be described, using FIG. 10. FIG. 10 is a functional block diagram for illustrating an example of an information processing device 1000 according to the present example embodiment. The blocks in FIG. 10 represent a configuration not in terms of hardware units but in terms of functional units. The information processing device 1000 according to the present example embodiment is different from the second example embodiment described above in that the information processing device 1000 includes a statistical value size upper-limit input unit 1001. In association with the above, operation of an optimum block size estimation unit 1002 also differs from that in the second example embodiment. The rest of constituent elements and operations are similar to those in the second example embodiment and, accordingly, identical signs will be assigned to identical constituent elements and operations, whose detail descriptions will be omitted here.

Statistical Value Size Upper-Limit Input Unit

The Statistical Value Size Upper-limit Input Unit 1001 Receives from the outside an upper limit value of the total holding size (storage capacity) for generated statistical values to be held in a storage device of the statistical value holding unit 204, and sets the value to the optimum block size estimation unit 1002.

Optimum Block Size Estimation Unit

The optimum block size estimation unit 1002 estimates a block size which is expected to minimize an average cost of processing for answering to a query performed by the query execution unit 206. The optimum block size estimation unit 1002 has a cost function for estimating an average cost of deriving an answer to a query taking a block size as input. As the cost function can use information on a data size, an expected value regarding the number of attributes and the like used for specifying a queried range and the like, the optimum block size estimation unit 1002 acquires those kinds of information by communicating with the block creation unit 202 and the query history holding unit 208. In estimating an optimum block size, a block size for minimizing the cost function is calculated and is determined to be the optimum block size.

In the calculation of an optimum block size, the optimum block size estimation unit 1002 calculates an upper limit value of the block size on the basis of the upper limit value of statistical value size which was set by the statistical value size upper-limit input unit 1001. Here, the statistical value size means the total size (storage capacity) for generated statistical values to be held in a storage device of the statistical value holding unit 204. Taking the calculated upper limit value as a constraint on the block size estimation, the optimum block size estimation unit 1002 performs minimization of the cost function and thereby estimates an optimum block size.

Example of Hardware Configuration

Figure 11:
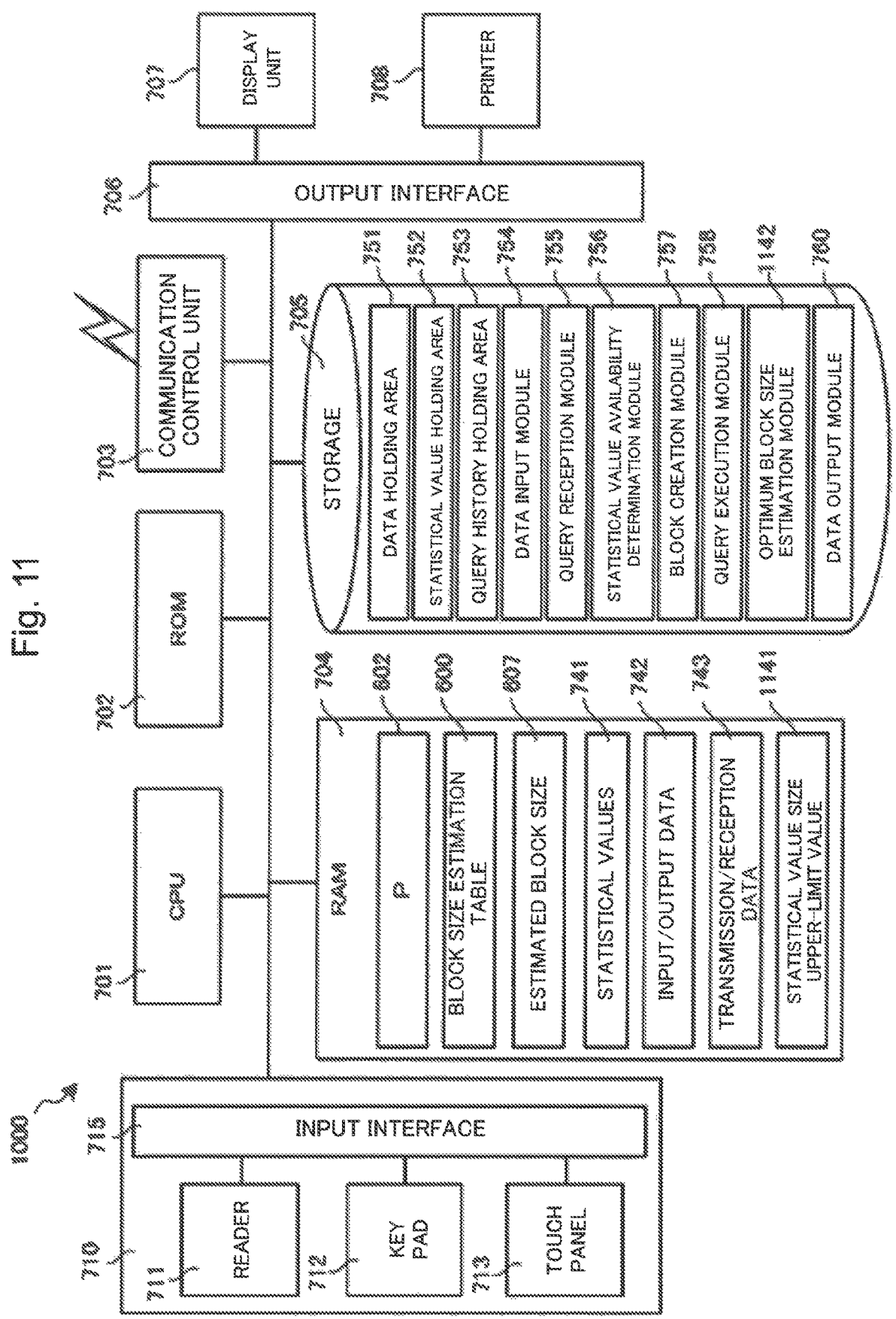
FIG. 11 is a block diagram illustrating an example of a hardware configuration of the information processing device according to the third example embodiment.

Next, an example of a hardware configuration of the information processing device 1000 according to the present example embodiment will be described, with reference to FIG. 11. The configuration is different from that of the second example embodiment in that a statistical value size upper-limit value 1141 is provided in the RAM 704 and that an optimum block size estimation module 1142 is provided, in place of the optimum block size estimation module 759, in the storage 705.

Here, the statistical value size upper-limit input unit 1001 is implemented by the CPU 701, the ROM 702, the communication control unit 703, the RAM 704, the input unit 710 and the statistical value size upper-limit value 1141. The optimum block size estimation unit 1002 is implemented by the CPU 701, the ROM 702, the RAM 704 and the optimum block size estimation module 1142.

Process Flow

In the information processing device 1000 of the present example embodiment, a flow of processing executed when data is input is similar to that in the second example embodiment, but the optimum block size estimation process is different.

Figure 12:
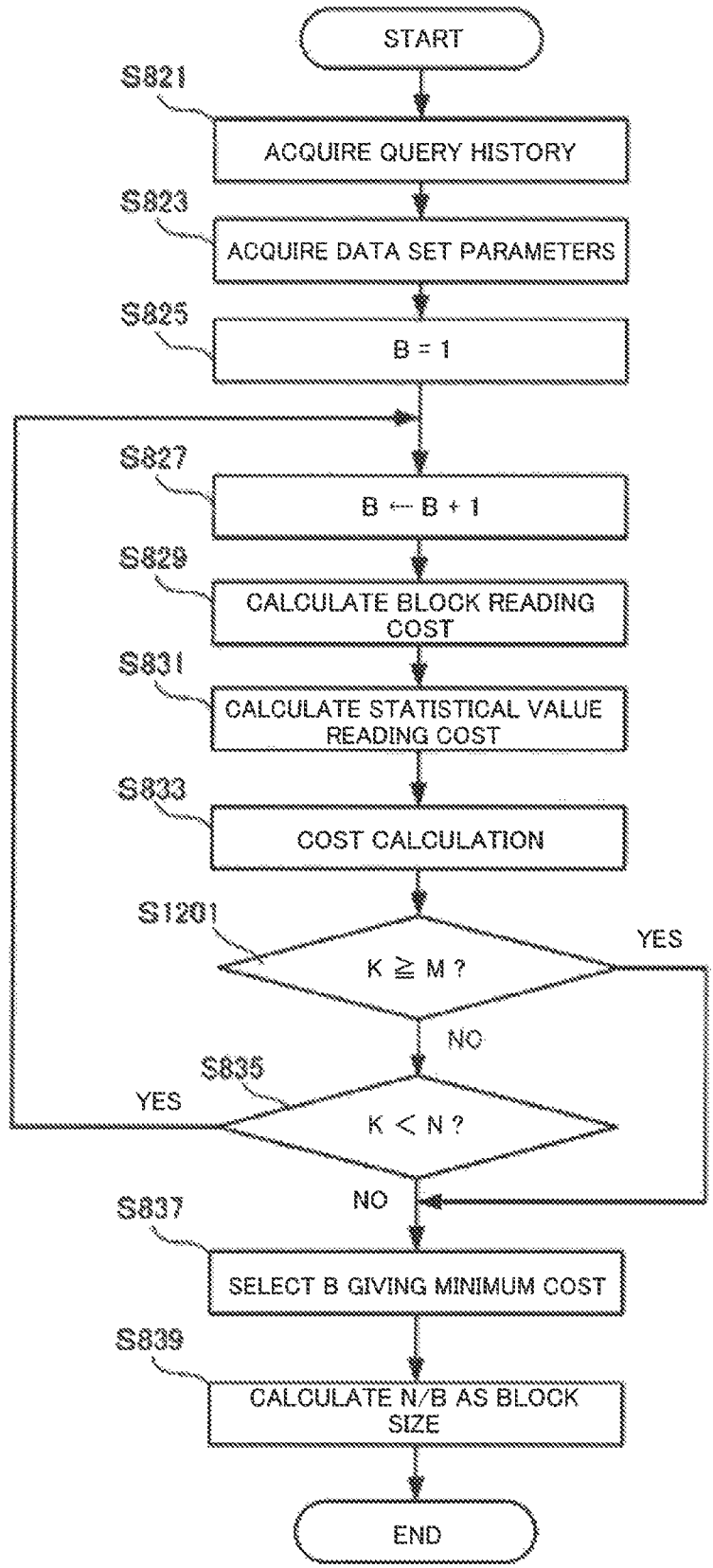
FIG. 12 is a flow chart illustrating a procedure of an optimum block size estimation process according to the third example embodiment.

The optimum block size estimation process in the present example embodiment will be described, illustrating its flow chart in FIG. 12. Here, the same portions as those in FIG. 8B will be denoted by the same signs, and their descriptions will be omitted. Between the process in the present example embodiment and that in the second example embodiment, there is a difference in that a step S1201 is added between the steps S833 and S835. Specifically, in the step S1201 after the process of the step S833, the optimum block size estimation unit 1002 determines whether or not a holding size of statistical values held by the statistical value holding unit 204 (storage capacity occupied by the entire statistical values), K, is equal to or larger than a statistical value size upper-limit value M which was input from the statistical value size upper-limit input unit 1001. If the determination gives a result that the holding size of statistical values held by the statistical value holding unit 204, K, is equal to or larger than the statistical value size upper-limit value M input from the statistical value size upper-limit input unit 1001, the optimum block size estimation unit 1002 executes the process by proceeding to the step S837. If the determination in the step S1201 gives a result that the holding size of statistical values held by the statistical value holding unit 204, K, is equal to or larger than the statistical value size upper-limit value M, the optimum block size estimation unit 1002 executes the process by proceeding to the step S835.

According to the present example embodiment, a block size for minimizing the average cost is calculated in such a way that the size of generated statistical values in a storage medium of the statistical value holding unit 204 does not exceed the upper limit set in advance. As a result, it becomes possible to prevent enlargement of a holding size of statistical values which are calculated in advance and held in a storage device of the statistical value holding unit 204.

Other Example Embodiments

While the disclosed subject matter has been described above with reference to the example embodiments, it is not limited to the above-described example embodiments. To the configurations and details of the disclosed subject matter, various modifications understandable to those skilled in the art may be made within the scope of the disclosed subject matter. Further, any system or device obtained by combining in any manner the mutually different characteristics included in the respective example embodiments is embraced within the scope of the disclosed subject matter.

For example, it is possible to increase the probability of statistical values' being available in a query by changing the order of records before horizontally dividing the table in the block creation unit 202. That is, by changing the order of records before horizontally dividing the table, the block creation unit 202 reduces variance of attribute values in each block and accordingly increases the probability of statistical values' being available in the query. Thereby, the number of blocks whose scanning can be omitted is increased and, accordingly, the I/O amount and calculation amount can be smaller. As a result, the query processing is performed efficiently.

An attribute in terms of which the order change is performed may be determined by a user, or by the system automatically. An example of a method of determining an attribute for the order change by a system is a method which selects an attribute frequently appearing in conditional expressions for selection processing in a history of previously executed queries. By employing the method, it is expected that the performance of query execution in the future is improved, because it generally is highly probable that a query resembling a previously executed query is executed in the future.

Further, the disclosed subject matter may be applied to a system composed of a plurality of apparatuses, and may also be applied to a single device. Furthermore, the disclosed subject matter is applicable also to a case where an information processing program for implementing the functions of the example embodiments is supplied to a system or a device directly or remotely. Accordingly, a program installed in a computer to implement the functions of the disclosed subject matter by the computer, a medium storing the program and a World Wide Web (WWW) server enabling the program to be downloaded are also embraced within the scope of the disclosed subject matter. In particular, at least a non-transitory computer readable medium storing a program for causing a computer to execute the processing steps included in the above-described example embodiments is embraced within the scope of the disclosed subject matter.

Alternative Expression of Example Embodiments

Part or the whole of the above-described example embodiments can be described as, but is not limited to, the following supplementary notes.

(Supplementary Note 1)

An Information Processing Device Including:

a statistical value holding means for holding a statistical value of data included in each of two or more blocks into which a data set is divided;

a query history holding means for holding information about a past query on the data set as a query history;

an estimation means for, based on the query history, estimating a block size that minimizes an average cost of deriving an answer to a query by using the statistical value of at least one of the blocks; and a block creation means for, based on the block size estimated by the estimation means, creating two or more blocks by dividing the data set, calculating the statistical value for each of the created blocks and causing the statistical value holding means to hold the calculated statistical values.

(Supplementary Note 2)

The information processing device according to supplementary note 1, wherein when the query is made, the estimation means acquires, based on the query history, an average value of a number of blocks whose data was used instead of the statistical values and, using the average value, estimates the block size.

(Supplementary Note 3)

The information processing device according to supplementary note 1 or 2, wherein the estimation means has a cost function for calculating the average cost taking the block size as a variable and, using the cost function, estimates the block size for minimizing the average cost.

(Supplementary Note 4)

The information processing device according to any one of supplementary notes 1 to 3, wherein the estimation means takes, as the average cost, a sum of a cost of referring to the statistical values calculated in advance for each of the blocks and a cost of reading the blocks including necessary data for deriving an answer to the query, and estimates the block size for minimizing the average cost.

(Supplementary Note 5)

The information processing device according to supplementary note 4, wherein the estimation means calculates the cost of referring to the statistical values (ReadMetaCost) by the use of a following equation, the equation including a total number of blocks B, an average value of a number of blocks whose data was used instead of using the statistical values P, a number of bytes to be used for holding statistical value of one block Sagg and a page size of a storage Spage.

$$ReadMetaCost = \left\lceil \frac{(B-P)Sagg}{Spage} \right\rceil \qquad \text{[Equation 6]}$$

(Supplementary Note 6)

The information processing device according to supplementary note 4, wherein the estimation means calculates the cost of reading blocks (ReadBlockCost) by the use of a following equation, the equation including a number of data elements N, a total number of blocks B, an average value of a number of blocks whose data was used instead of using the statistical values P, a size of one data element Stuple and a page size of a storage Spage.

$$ReadBlockCost = \left\lceil \frac{P \left\lceil \frac{N}{B} \right\rceil Stuple}{Spage} \right\rceil \quad \text{[Equation 7]}$$

(Supplementary Note 7)

The information processing device according to any one of supplementary notes 1 to 6, wherein the estimation means estimates the block size for minimizing the average cost of deriving the answer, in such a way that a holding size of the statistical value holding means for holding of the statistical values does not exceed an upper limit value set in advance.

(Supplementary Note 8)

The information processing device according to any one of supplementary notes 1 to 7, wherein:

the data set is configured as a table including two or more records having an attribute; and the block creation means creates the table in which the records are rearranged in terms of the attribute, and subsequently divides the table into two or more blocks each including one or more of the records.

(Supplementary Note 9)

The information processing device according to any one of supplementary notes 1 to 8, further including:

a data holding means for holding the data set;

a query reception means for receiving a query on the data set;

a determination means for determining whether or not a statistical value of each block held by the statistical value holding means is available for a query received by the query reception means; and a query execution means for, when a statistical value of a block is determined to be available as a result of the determination by the determination means, creating an answer to the query by using the available statistical value.

(Supplementary Note 10)

An information processing method including:

a query history holding step of holding information about a past query on a data set as a query history;

an estimation step of, based on the query history, estimating a block size that minimizes an average cost of deriving an answer to a query by using statistical value of at least one of blocks; and a block creation step of, based on the block size estimated in the estimation step, creating two or more blocks by dividing the data set, and also calculating statistical values for each of the created blocks.

(Supplementary Note 11)

A recording medium storing an information processing program for causing a computer to execute:

a query history holding step of holding information about past queries on a data set as a query history;

an estimation step of, based on the query history, estimating a block size for minimizing an average cost of deriving an answer to a query by using statistical values of some blocks; and a block creation step of, based on the block size estimated in the estimation step, creating two or more blocks by dividing the data set, and also calculating the statistical value for each of the created blocks.

The disclosed subject matter has been described above, taking the above-described example embodiments as exemplary examples. However, the disclosed subject matter is not limited to the above-described example embodiments. That is, to the disclosed subject matter, various aspects which can be understood by those skilled in the art may be applied within the scope of the disclosed subject matter.

This application is based upon and claims the benefit of priority from Japanese Patent Application No. 2015-094624, filed on May 7, 2015, the disclosure of which is incorporated herein in its entirety by reference.

The invention claimed is:

1. An information processing device comprising:
a memory configured to store instructions; and
a hardware processor configured to execute the instructions to:
hold a statistical value of data included in each of two or more blocks into which a data set is divided;
hold information about a past query on the data set as a query history;
take, as an average cost, a sum of a cost of referring to the statistical values calculated in advance for each of the blocks and a cost of reading the blocks including necessary data for deriving an answer to the query, and estimate the block size for minimizing the average cost, wherein the hardware processor is further configured to execute the instructions to calculate the cost of referring to the statistical values (ReadMetaCost) by the use of a following equation, the equation including a total number of blocks B, an average value of a number of blocks whose data was used instead of using the statistical values P, a number of bytes to be used for holding statistical value of one block Sagg and a page size of a storage Spage, $$ReadMetaCost = \left\lceil \frac{(B-P)Sagg}{Spage} \right\rceil; \quad \text{[Equation 1]}$$

estimate, based on the query history, a block size that minimizes the average cost of deriving an answer to a query by using the statistical value of at least one of the blocks; and
create, based on the block size, two or more blocks by dividing the data set, calculate the statistical value for each of the created blocks and hold the calculated statistical values.

2. The information processing device according to claim 1, wherein the hardware processor is further configured to execute the instructions to, when the query is made, acquire, based on the query history, an average value of a number of blocks whose data was used instead of the statistical values and, using the average value, estimates the block size.

3. The information processing device according to claim 1, wherein the hardware processor is further configured to execute the instructions to calculate the average cost taking the block size as a variable and estimate the block size for minimizing the average cost.

4. The information processing device according to claim 1, wherein the hardware processor is further configured to execute the instructions to calculate the cost of reading blocks (ReadBlockCost) by the use of a following equation, the equation including a number of data elements N, a total number of blocks B, an average value of a number of blocks whose data was used instead of using the statistical values P, a size of one data element Stuple and a page size of a storage Spage.

$$ReadBlockCost = \left\lceil \frac{P\left\lceil \frac{N}{B} \right\rceil Stuple}{Spage} \right\rceil.$$  [Equation 2]

5. The information processing device according to claim 1, wherein the hardware processor is further configured to execute the instructions to estimate the block size for minimizing the average cost of deriving the answer under a constraint that a holding size of the statistical value holding unit configured to hold of the statistical values does not exceed an upper limit value set in advance.

6. The information processing device according to claim 1, wherein the data set is configured as a table including two or more records having an attribute; and the hardware processor is further configured to execute the instructions to create the table in which the records are rearranged in terms of the attribute, and subsequently divide the table into two or more blocks each including one or more of the records.

7. An information processing method performed by a computing device including a hardware processor, the information processing method comprising:

holding information about a past query on a data set as a query history;

taking, as an average cost, a sum of a cost of referring to the statistical values calculated in advance for each of the blocks and a cost of reading the blocks including necessary data for deriving an answer to the query, and estimating the block size for minimizing the average cost, the hardware processor is configured to calculate the cost of referring to the statistical values (ReadMetaCost) by using a following equation, the equation including a total number of blocks B, an average value of a number of blocks whose data was used instead of using the statistical values P, a number of bytes to be used for holding statistical value of one block Sagg and a page size of a storage Spage, $$ReadMetaCost = \left\lceil \frac{(B-P)Sagg}{Spage} \right\rceil;$$  [Equation 1]

based on the query history, estimating a block size that minimizes the average cost of deriving an answer to a query by using statistical value of at least one of blocks; and based on the block size estimated creating two or more blocks by dividing the data set, and also calculating statistical values for each of the created blocks.

8. A non-transitory computer-readable recording medium storing an information processing program for causing a computer to execute instructions to perform:

holding information about a past query on a data set as a query history;

taking, as an average cost, a sum of a cost of referring to the statistical values calculated in advance for each of the blocks and a cost of reading the blocks including necessary data for deriving an answer to the query, and estimating the block size for minimizing the average cost, calculating the cost of referring to the statistical values (ReadMetaCost) by using of a following equation, the equation including a total number of blocks B, an average value of a number of blocks whose data was used instead of using the statistical values P, a number of bytes to be used for holding statistical value of one block Sagg and a page size of a storage Spage, $$ReadMetaCost = \left\lceil \frac{(B-P)Sagg}{Spage} \right\rceil;$$  [Equation 1]

based on the query history, estimating a block size the minimizes the average cost of deriving an answer to a query by using statistical value of at least one of the blocks; and based on the block size estimated, creating two or more blocks by dividing the data set, calculating the statistical value for each of the created blocks.

* * * * *